(12) United States Patent
Hashimoto et al.

(10) Patent No.: US 11,584,659 B2
(45) Date of Patent: Feb. 21, 2023

(54) IRON OXIDE POWDER, COMPOSITION, CERAMICS, IRON OXIDE POWDER PRECURSOR, METHOD FOR PRODUCING IRON OXIDE POWDER PRECURSOR, AND METHOD FOR PRODUCING IRON OXIDE POWDER

(71) Applicant: KOGAKUIN UNIVERSITY, Tokyo (JP)

(72) Inventors: Hideki Hashimoto, Hideki (JP); Hidetaka Asoh, Tokyo (JP); Jun Takada, Okayama (JP); Tatsuo Fujii, Okayama (JP)

(73) Assignee: Kogakuin University, Tokyo (JP)

( * ) Notice: Subject to any disclaimer, the term of this patent is extended or adjusted under 35 U.S.C. 154(b) by 0 days.

(21) Appl. No.: 17/254,688

(22) PCT Filed: Jun. 21, 2019

(86) PCT No.: PCT/JP2019/024828
§ 371 (c)(1),
(2) Date: Dec. 21, 2020

(87) PCT Pub. No.: WO2019/245046
PCT Pub. Date: Dec. 26, 2019

(65) Prior Publication Data
US 2021/0269327 A1    Sep. 2, 2021

(30) Foreign Application Priority Data

Jun. 21, 2018 (JP) .............................. JP2018-118338

(51) Int. Cl.
*C01G 49/00* (2006.01)
*C04B 35/44* (2006.01)
(Continued)

(52) U.S. Cl.
CPC .......... *C01G 49/0045* (2013.01); *C04B 35/44* (2013.01); *C04B 35/62222* (2013.01); *C04B 35/62675* (2013.01); *C04B 35/62813* (2013.01); *C04B 35/62826* (2013.01); *C01P 2004/03* (2013.01); *C01P 2004/24* (2013.01);
(Continued)

(58) Field of Classification Search
CPC .. C01G 49/06; C01G 49/0045; C01P 2006/65
See application file for complete search history.

(56) References Cited

U.S. PATENT DOCUMENTS

2004/0007160 A1    10/2004    Rosocha

FOREIGN PATENT DOCUMENTS

JP    2004043208    2/2004
JP    2004122077    4/2004
(Continued)

OTHER PUBLICATIONS

Hashimoto, ACS Appl. Mater. Interfaces. 2014, 6, 20282-20289 (Year: 2014).*

(Continued)

*Primary Examiner* — Alexandre F Ferre
(74) *Attorney, Agent, or Firm* — Fish & Richardson P.C.

(57) ABSTRACT

An iron oxide powder includes a porous structure having the diameter of from 0.3 μm to 2 μm, wherein the iron oxide powder has an aluminum content of from 10 mol % to 80 mol %.

11 Claims, 9 Drawing Sheets

(51) Int. Cl.
  *C04B 35/622* (2006.01)
  *C04B 35/626* (2006.01)
  *C04B 35/628* (2006.01)

(52) U.S. Cl.
  CPC ...... *C01P 2004/32* (2013.01); *C01P 2004/64* (2013.01); *C01P 2006/12* (2013.01); *C01P 2006/14* (2013.01)

(56) References Cited

FOREIGN PATENT DOCUMENTS

| | | |
|---|---|---|
| JP | 2007-204348 | 8/2007 |
| JP | 2007321043 | 12/2007 |
| JP | 2008001542 | 1/2008 |
| JP | 2011-213572 | 10/2011 |
| JP | 2015086126 | 5/2015 |
| KR | 101401352 | 5/2014 |

OTHER PUBLICATIONS

Supporting information for Hashimoto, ACS Appl. Mater. Interfaces. 2014, 6, 20282-20289 (Year: 2014).*

Cao et al., "Influence of Al Substitution on Magentism and Adsorption Properties of Hematite", Journal of Solid State Chemisty, Mar. 6, 2015, 8 pages.

Hashimoto et al., "Preparation, Microstructure, and Color Tone of Microtubule Material Composed of Hematite/Amorphous-Silicate Nanocomposite from Iron Oxide of Bacterial Origin", Dyes and Pigments, 2012, pp. 639-643.

PCT International Search Report and Written Opinion in Appln. No. PCT/JP2019/024828, dated Sep. 10, 2019.

Office Action in Chinese Appln. No. 201980041791.3, dated Sep. 20, 2022, 32 pages (with English translation).

* cited by examiner

IRON OXIDE POWDER, COMPOSITION, CERAMICS, IRON OXIDE POWDER PRECURSOR, METHOD FOR PRODUCING IRON OXIDE POWDER PRECURSOR, AND METHOD FOR PRODUCING IRON OXIDE POWDER

CLAIM OF PRIORITY

This application claims priority under 35 USC § 120 to WIPO Application Serial No. PCT/JP2019/024828 filed on Jun. 21, 2019 and now published as WO 2019/0245046 A1 on Dec. 26, 2019; which claims priority to Japan Application No. 2018-118338 filed Jun. 21, 2018, the entire contents of each and both are hereby incorporated by reference.

TECHNICAL FIELD

The present disclosure relates to an iron oxide powder, a composition, a ceramic, an iron oxide powder precursor, a method of producing an iron oxide powder precursor, and a method of producing an iron oxide powder.

BACKGROUND ART

Conventional examples of iron oxide powders include red iron oxide powders composed mainly of hematite, which are known to be used as pigments for asphalt, ceramics, plastics, and cosmetics.

The colors of such pigments, however, are lacking in chroma. In applications exposed to high temperatures, such as ceramics, there is the problem of grain growth of hematite particles and color fading.

Up to now, iron oxide red pigments with high chroma have been developed (see Patent Documents 1 to 3). Hematite, which shows a stable color even when heated at high temperatures, has also been developed (see Patent Document 4).

Various other studies have been done on hematite (see Non-Patent Documents 1 to 2).

[Patent Document 1] Japanese Patent Application Laid-Open (JP-A) No. 2015-86126
[Patent Document 2] Japanese Patent Application Laid-Open (JP-A) No. 2008-1542
[Patent Document 3] Japanese Patent Application Laid-Open (JP-A) No. 2007-321043
[Patent Document 4] Japanese Patent Application Laid-Open (JP-A) No. 2004-43208
[Non Patent Document 1] Hideki Hashimoto, et al. ACS Appl. Mater. Interfaces 2014, 6, 20282-20289
[Non Patent Document 2] Hideki Hashimoto, et al. Dyes and Pigments 95 (2012) 639-643

SUMMARY OF INVENTION

Technical Problem

However, the chroma of red iron oxide powder is still insufficient, and the heat resistance thereof is also insufficient.

Accordingly, there is a need for an iron oxide powder that displays a vivid red color and has high heat resistance that reduces color fade even when exposed to high temperatures.

Accordingly, one aspect of the present disclosure addresses provision of an iron oxide powder that exhibits a more vivid red color and is more heat resistant than conventional iron oxide red pigment, and a composition and a ceramic including the iron oxide powder.

Another aspect of the present disclosure addresses provision of an iron oxide powder precursor for producing an iron oxide powder that exhibits a more vivid red color and is more heat resistant than a conventional iron oxide red pigment.

Still another aspect of the present disclosure addresses provision of a method of producing an iron oxide powder precursor and a method of producing an iron oxide powder, with a view to producing an iron oxide powder that exhibits a more vivid red color and is more heat resistant than a conventional iron oxide red pigment.

Solution to Problem

Means for solving the above-described problems include the following aspects.

<1> An iron oxide powder, including a porous structure having a diameter of from 0.3 μm to 2 μm, the iron oxide powder having an aluminum content of from 10 mol % to 80 mol %.

<2> The iron oxide powder according to <1>, wherein alumina particles are attached to a surface of the porous structure.

<3> The iron oxide powder according to <1> or <2>, wherein the porous structure has a BET specific surface area of from 20 $m^2$/g to 150 $m^2$/g and a pore volume of from 0.15 $cm^3$/g to 0.60 $cm^3$/g.

<4> The iron oxide powder according to any one of <1> to <3>, wherein the porous structure includes an aggregate of primary particles, and an average particle size of the primary particles is from 10 nm to 50 nm.

<5> The iron oxide powder according to any one of <1> to <4>, wherein the iron oxide powder exhibits a chroma of 25 or more when the iron oxide powder is heated at 1,100° C. for 1 hour.

<6> A composition, including the iron oxide powder according to any one of <1> to <5>.

<7> A ceramic, including: a substrate layer; and a glaze layer containing the iron oxide powder according to any one of <1> to <5>.

<8> An iron oxide powder precursor, including a porous structure having a diameter of from 0.3 μm to 2 μm, the iron oxide powder precursor having an aluminum content of from 10 mol % to 80 mol %.

<9> The iron oxide powder precursor according to <8>, wherein the porous structure includes an aggregate of primary particles, and an average particle size of the primary particles is 5 nm or less.

<10> A method of producing the iron oxide powder precursor according to <8> or <9>, the method including: mixing aluminum nitrate, ammonium bicarbonate, and at least one metal salt selected from the group consisting of iron nitrate, iron sulfate, and iron chloride (II); and producing the iron oxide powder precursor by employing a co-precipitation method.

<11> The method of producing an iron oxide powder precursor according to <10>, wherein the aluminum nitrate, the ammonium bicarbonate, and an aqueous solution that contains the at least one metal salt at a total concentration of from 0.3 mol·$dm^{-3}$ to 0.7 mol·$dm^{-3}$, are mixed, and the iron oxide powder precursor is produced by employing a co-precipitation method.

<12> A method of producing an iron oxide powder, the method including calcining the iron oxide powder precursor obtained by the method of producing an iron oxide powder precursor according to <10> or <11>, thereby producing the iron oxide powder.

Advantageous Effects of Invention

According to one aspect of the present disclosure, an iron oxide powder that exhibits a more vivid red color and is more heat resistant than conventional iron oxide red pigment, and a composition and a ceramic including the iron oxide powder are provided.

According to another aspect of the present disclosure, an iron oxide powder precursor for producing an iron oxide powder that exhibits a more vivid red color and is more heat resistant than a conventional iron oxide red pigment is provided.

According to still another aspect of the present disclosure, a method of producing an iron oxide powder precursor and a method of producing an iron oxide powder are provided with a view to producing an iron oxide powder that exhibits a more vivid red color and is more heat resistant than a conventional iron oxide red pigment.

DESCRIPTION OF EMBODIMENTS

Figure 1:
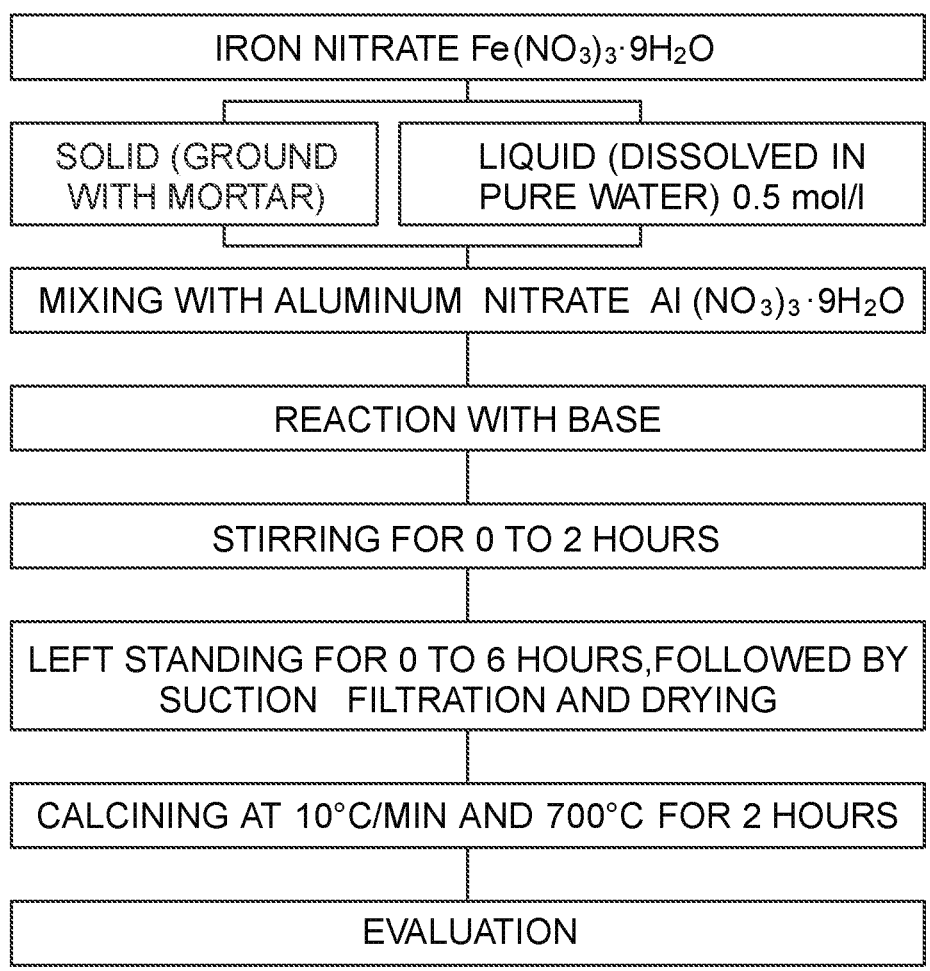
FIG. 1 is a flowchart of a procedure for preparing an iron oxide powder of the present disclosure.

Hereinafter, an example of a preferred embodiment of the present invention will be described in detail.

The iron oxide powder of the present disclosure includes a porous structure having a diameter of from 0.3 μm to 2 μm, and the iron oxide powder has an aluminum content of from 10 mol % to 80 mol %.

Due to the above-described configuration, the iron oxide powder of the present disclosure is an iron oxide powder that exhibits a more vivid red color and is more heat resistant than conventional iron oxide red pigments. We have devised the iron oxide powder of the present disclosure, based on the following findings.

It is generally known that the smaller the particle size is, or the higher the dispersibility of the particles is, the more vivid and brighter the red color of hematite is. Furthermore, it has been reported that when a solid solution of aluminum in hematite is formed, the powder becomes a bright red powder.

The reason for the high chroma of the iron oxide powder of the present disclosure is considered to be that a solid solution of aluminum in hematite is formed and that the iron oxide powder of the present disclosure is formed from a porous structure having a diameter of from 0.3 μm to 2 μm, which was a novel structure. Here, "solid solution" means that elements that are different from each other melt together to form a single solid phase as a whole.

Next, the following may be the reason for the high heat resistance of the iron oxide powder of the present disclosure.

In general, when iron oxide powder, of which hematite is a principal component, is heated at a high temperature, sintering between the particles progresses and grain growth occurs, as a result of which the hematite turns gray or black instead of red.

On the other hand, when the iron oxide powder of the present disclosure is heated at high temperature, it was observed that the morphology of the porous structure having a diameter of from 0.3 μm to 2 μm is maintained until 1,000° C.

Therefore, it is considered that the iron oxide powder of the present disclosure has a novel porous structure, and thus has a structure in which sintering between particles is less likely to progress than conventional ones. Furthermore, in the iron oxide powder of the present invention, sintering within particles is considered to progress preferentially over sintering between particles. As a result, it is presumed that the progress of grain growth is slowed down due to the slowing down of the progress of sintering between particles.

Accordingly, the iron oxide powder of the present disclosure is considered to be less likely to cause grain growth due to the characteristic structure of the powder, and thus retains vivid red color even when heated at high temperatures.

From the above, we have found that the iron oxide powder of the present disclosure exhibits a more vivid red color and is more heat resistant than conventional iron oxide red pigments.

In an iron oxide powder according to another aspect of the present disclosure, it was observed that the iron oxide powder is a disc-shaped porous structure.

When the iron oxide powder was observed, there was little aggregation between the disc-shaped porous structures.

The reason for the high chroma of the iron oxide powder of the other aspect of the present disclosure can be, first of all, that a solid solution of aluminum in the hematite is formed. Further, since there was little aggregation of a disc-shaped porous structure as described above, the high dispersibility of the disc-shaped porous structure is considered to be a major contributing factor.

Next, the reason for the high heat resistance of the iron oxide powder of the other aspect of the present disclosure is considered as follows.

As described above, in general, when iron oxide powder including hematite as a principal component is heated at a high temperature, sintering between the particles progresses and grain growth causes the hematite to turn gray or black instead of red. However, it was observed that the morphology of the disc-shaped porous structure was maintained up to 1,000° C. when the iron oxide powder of the other aspect of the present disclosure was heated at high temperatures.

Therefore, it is considered that the iron oxide powder of the present disclosure has a novel disc-shaped porous structure, and thus has a structure in which sintering between particles is less likely to progress than conventional ones.

Hereinafter, details of the iron oxide powder of the present disclosure will be described.

[Iron Oxide Powder]

The iron oxide powder of the present disclosure includes a porous structure having a diameter of from 0.3 μm to 2 μm, and the iron oxide powder has an aluminum content of from 10 mol % to 80 mol %. Here, the aluminum content is the ratio (mol %) of Al to the total amount of Fe and Al in the iron oxide powder.

When the aluminum content is less than 10 mol % or more than 80 mol %, it is difficult to obtain a vivid red color. From the viewpoint of obtaining a vivid red iron oxide powder, the aluminum content is preferably from 15 mol % to 70 mol %, and more preferably from 30 mol % to 40 mol %.

Herein, a porous structure does not mean the structure configured from a dense body or a hollow body, but refers to a structure that is, for example, an aggregate of plural particles, in which gaps between the particles form pores.

The iron oxide powder of the present disclosure includes hematite powder as a principal component. The iron oxide powder of the present disclosure may also include limonite powder, magnetite powder, ustite powder, maghemite powder, or the like in addition to hematite powder, or may include any two or more kinds thereof. From the viewpoint of obtaining a vivid red iron oxide powder, the content of hematite powder with respect to the iron oxide powder excluding the alumina component is preferably 90% by mass or more, more preferably 95% by mass or more, and still more preferably 98% by mass or more.

The shape of a porous structure which is the iron oxide powder of the present disclosure is not particularly limited, and from the viewpoint of obtaining vivid red iron oxide powder, the shape is preferably spherical, plate-shaped, or disc-shaped, and is more preferably disc-shaped.

Herein, the term "disc-shaped" means a shape that is a circular board-shape having a certain thickness. The concept of circular is a concept that encompasses the shape of an irregular circle as well as a perfect circle and an ellipse.

In the iron oxide powder of the present disclosure, the porous structure is a secondary particle formed by an aggregate of primary particles of iron oxide. In other words, the porous structure of the present invention is, from the viewpoint of obtaining a vivid red iron oxide powder, preferably a spherical secondary particle, a plate-shaped secondary particle, or a disc-shaped secondary particle, and more preferably a disc-shaped secondary particle. The secondary particles include fine pores formed by the primary particles.

Primary particles refer to independent particles without aggregation.

In the iron oxide powder of the present disclosure, the porous structure is from 0.3 μm to 2 μm in diameter and is preferably from 0.6 μm to 1.6 μm in diameter from the viewpoint of obtaining a vivid red iron oxide powder.

When the porous structure is disc-shaped, the thickness of the disc is, from a similar viewpoint, preferably from 150 nm to 800 nm, and more preferably from 180 nm to 750 nm.

Here, the diameter of the porous structure is measured by the following measurement method.

A scanning electron microscope (manufactured by JEOL Ltd., JSM-6701F) is used to observe the iron oxide powder, and the longest diameter of the porous structure is measured as the diameter of the porous structure.

This measurement is carried out for observed porous structures, and an average value is calculated from the maximum and minimum values of the obtained values, and the average value is used as the diameter of the porous structure.

The area to be observed in the measurement is 9 μm×12 μm.

When the shape of the porous structure is disc-shaped, the diameter and thickness of the porous structure are measured as follows.

Iron oxide powder is observed using a scanning electron microscope (manufactured by JEOL Ltd., JSM-6701F), and a porous structure whose side face of the disc-shape thereof can be observed is selected, and the thickness of the porous structure is defined as the thickness of the thickest portion; further, a porous structure whose face intersecting the thickness direction can be observed is selected, and the longest diameter is measured as the diameter of the porous structure.

This measurement is performed on observed porous structures, the average value is calculated from the maximum and minimum values of the obtained values, and the average value is defined as the diameter or thickness of the porous structure.

In the measurement, the area to be observed is 9 μm×12 μm.

In the iron oxide powder of the present disclosure, the primary particle size of the iron oxide forming the porous structure is suitably 10 nm or more, and from the viewpoint of obtaining a vivid red iron oxide powder, the primary particle size is preferably 55 nm or less, more preferably 50 nm or less, still more preferably 35 nm or less, and particularly preferably 25 nm or less.

The primary particle size of iron oxide refers to the average particle size of the primary particles of the iron oxide.

The average particle size of primary particles is a value as measured by the following method.

A scanning transmission electron microscope (manufactured by JEOL Ltd., JEM-2100F) is used to observe iron oxide powder, in which individual particles forming each secondary particle are defined as primary particles, and images are taken by adjusting the scanning transmission electron microscope to a magnification that allows for image analysis of primary particles.

The particle size is measured for 25 or more primary particles from the image taken. The maximum diameter of the primary particle is taken as the particle size, and the average value of the particle sizes is calculated as the average particle size of the primary particles. The particle size of primary particles refers to the obtained average particle size of primary particles.

Alumina particles are preferably attached to the surface of the porous structure of the iron oxide powder of the present disclosure.

When alumina particles are attached to the porous structure, it is considered that sintering between iron oxide particles is less likely to progress when the iron oxide powder is heated at a high temperature, which is advantageous from the viewpoint of obtaining an iron oxide powder with excellent heat resistance.

The average particle size of the alumina particles attached to the surface of the porous structure is very small and is smaller than the average particle size of the primary particles that form the porous structure.

The average particle size of alumina particles is, from the viewpoint of obtaining an iron oxide powder with excellent heat resistance, preferably 10 nm or less, and more preferably from 3 nm to 6 nm.

The measurement method of the average particle size of alumina particles is as follows.

Iron oxide powder is observed using a scanning transmission electron microscope (manufactured by JEOL Ltd., JEM-2100F), in which the individual particles forming each secondary particle are defined as primary particles, and images are taken by adjusting the scanning transmission electron microscope to a magnification that allows image analysis of alumina particles attached to the primary particles.

The particle size is measured for 8 or more alumina particles from the image taken.

The maximum diameter of each alumina particle is taken as the particle size, and the average value of the particle sizes is calculated as the average particle size of the alumina particles. The particle size of alumina particles refers to the obtained average particle size of alumina particles.

(Specific Surface Area, Pore Size Distribution, Pore Volume)

In the iron oxide powder of the present disclosure, the porous structure includes pores (connected pores and non-connected pores) formed by primary particles.

In the iron oxide powder of the present disclosure, the BET specific surface area of the porous structure is, from the viewpoint of obtaining a vivid red iron oxide powder, preferably from 15 m$^2$/g to 170 m$^2$/g, more preferably from 20 m$^2$/g to 160 m$^2$/g, and still more preferably from 80 m$^2$/g to 150 m$^2$/g.

In the iron oxide powder of the present disclosure, the pore volume of the porous structure is, from the viewpoint of obtaining a vivid red iron oxide powder, preferably from 0.10 cm$^3$/g to 0.65 cm$^3$/g, more preferably from 0.15 cm$^3$/g to 0.60 cm$^3$/g, and still more preferably from 0.35 cm$^3$/g to 0.55 cm$^3$/g.

(Measurement of BET Specific Surface Area)

The specific surface area was measured by a nitrogen substitution method using a Belsorp Mini II (manufactured by BEL Japan, Inc.). Specifically, the specific surface area, the pore size distribution, and the pore volume were determined from the adsorption/desorption isotherms of nitrogen gas at the liquid nitrogen temperature of a sample, which had been placed in a cell and degassed at 300° C. for 5 hours in a vacuum. The BET method was used to analyze the specific surface area, and the BJH method was used to analyze the pore size distribution.

(Chroma)

The chroma of the iron oxide powder of the present disclosure is, from the viewpoint of obtaining a vivid red iron oxide powder, preferably 40 or more, more preferably 50 or more, and still more preferably 60 or more. The upper limit value of the chroma of the iron oxide powder of the present disclosure is not particularly limited, and is preferably 70 or less for practical purposes.

From the viewpoint of heat resistance, the chroma of the iron oxide powder of the present disclosure when heated at at least 1,100° C. for at least one hour is preferably 10 or more, more preferably 25 or more, and still more preferably 35 or more. The upper limit value of the chroma of the iron oxide powder of the present disclosure when heated, for example, at 1,100° C. for one hour is not particularly limited, and is preferably 55 or less for practical purposes.

The measurement of the chroma (also referred to as "chroma value") is carried out as follows. The coordinate values (L* value, a* value, and b* value) of the CIE 1976L*a*b* color system for a sample are measured using "CM-5" (Illuminant: CIE standard light source D65, standard observer (viewing angle): 2 degrees) manufactured by KONICA MINOLTA JAPAN, INC. A Petri dish for powder measurement is used in the measurement. Then, from the above-measured coordinate values, the lightness value, the hue angle, and the chroma value are obtained as follows.

Specifically, the above-described "lightness value" refers to the L* value among the above-measured coordinate values.

The above-described "hue angle" is the angle formed by the line connecting the position defined by a* and b* in the above-measured coordinate values and the origin, and the a* axis. The origin is defined as the position where a* and b* are both 0 in the coordinates of the CIE 1976L*a*b* color system (that is, the achromatic position where the a* axis and the b* axis intersect).

The above-described "chroma value" refers to the value of c* calculated by the following Formula using a* and b* of the above-measured coordinate values.

$$c^* = ((a^*)^2(b^*)^2)^{1/2}$$ Formula:

[Composition]

The composition of the present disclosure includes the iron oxide powder of the present disclosure. The composition is, for example, a sintered body, a paint, or a lithium ion battery electrode material. When the composition of the present disclosure is a sintered body containing the iron oxide powder of the present disclosure, the composition preferably contains glass as a principal component (that is, 50% by mass or more of the entire composition). The content of the iron oxide powder is preferably 25% by mass or less, more preferably 20% by mass or less, and still more preferably 15% by mass or less, with respect to the entire composition.

(Ceramics)

Specific examples of a sintered body containing the iron oxide powder of the present disclosure include a ceramic that can be obtained by applying a glaze containing the iron oxide powder of the present disclosure to a substrate and sintering the glaze. In other words, the ceramic of the present disclosure includes a glaze layer containing an iron oxide powder and a substrate layer. The ceramic of the present disclosure may be provided with another layer in addition to the substrate layer and the glaze layer. Examples of the other layer include an intermediate layer provided between the substrate layer and the glaze layer for color adjustment, and a hard coat layer provided on the top surface of the ceramic.

The composition of the substrate layer is not particularly limited, and the substrate layer can be formed, for example, using a slurry that is prepared by adding a predetermined amount of water to a blend of ceramic raw materials such as kaolin, clay, pottery stone, and feldspar, and finely grinding the blend in a ball mill.

The composition of a glaze to form a glaze layer includes at least the iron oxide powder of the present disclosure, and is not particularly limited. A glaze layer can be formed using a slurry that is prepared by adding a predetermined amount of water to a blend of glaze materials such as silica sand, clay, lime, feldspar, and zinc oxide powder, in addition to the iron oxide powder of the present disclosure, and finely grinding the blend in a ball mill.

[Method of Producing Iron Oxide Powder Precursor]

The iron oxide powder precursor of the present disclosure can be obtained by a co-precipitation method after mixing at least one metal salt selected from the group consisting of iron nitrate, iron sulfate, and iron chloride (II), aluminum nitrate, and ammonium bicarbonate.

The co-precipitation method is one of the methods for preparing powders in which plural poorly soluble salts are simultaneously precipitated by adding a base to a solution containing plural metal ions of interest.

Examples of the base include ammonium bicarbonate (solid), ammonia solution (liquid), sodium carbonate, and sodium bicarbonate, and since ammonium bicarbonate is preferable from the viewpoint of obtaining a vivid red iron oxide powder, ammonium bicarbonate is used in the method of producing an iron oxide powder precursor of the present disclosure.

At least one of (i) at least one metal salt selected from the group consisting of iron nitrate, iron sulfate, and iron chloride (II), or (ii) aluminum nitrate may be a solid, or a liquid in which a hydrate is dissolved. From the viewpoint of obtaining a vivid red iron oxide powder, both of (i) at least one metal salt selected from the group consisting of iron nitrate, iron sulfate, and iron (II) chloride and (ii) aluminum nitrate are preferably used in the form of the hydrate and made into an aqueous solution.

When at least one metal salt selected from the group consisting of iron nitrate, iron sulfate, and iron chloride (II) is used in the aqueous solution as described above, the total concentration of the above-described metal salts in the aqueous solution is, from the viewpoint of obtaining a vivid red iron oxide powder, preferably from 0.2 mol·dm$^{-3}$ to 0.8 mol·dm$^{-3}$, and more preferably from 0.3 mol·dm$^{-3}$ to 0.7 mol·dm$^{-3}$.

The method of producing an iron oxide powder precursor of the present disclosure may specifically include the following steps 1) to 5).

1) Grind at least one metal salt selected from the group consisting of iron nitrate, iron sulfate, and iron (II) chloride in a mortar, or dissolve at least one metal salt selected from the group consisting of iron nitrate, iron sulfate, and iron (II) chloride in pure water to obtain a liquid.

2) Mix with aluminum nitrate. At this time, adjust the addition amount of each raw material to provide a molar ratio between iron and aluminum such that the molar ratio of Al/(Fe+Al) is in the range of from 0.05 to 0.8.

3) After the above-described step (2), add a base.

4) Stir the suspension liquid obtained in the above-described steps 1) to 3) for 0 to 2 hours.

5) After the above-described step 4), leave the suspension liquid to stand for 0 to 6 hours, followed by suction filtration and drying.

By using the above-described co-precipitation method, a solid solution of aluminum in hematite can be formed. The obtained iron oxide powder precursor is a porous structure having a diameter of from 0.3 μm to 2 μm. The average particle size of the primary particles forming the porous structure is preferably 5 nm or less from the viewpoint of obtaining a vivid red powder. The lower limit value of the average particle size of the primary particles is not particularly limited, and is, for example, 1 μm or more. In the iron oxide powder precursor of the present disclosure, the porous structure included an aggregate of primary particles.

In the iron oxide powder precursor, the diameter of the porous structure and the average particle size of the primary particles are measured in the same manner as described above for the iron oxide powder of the present disclosure.

Herein, the iron oxide powder precursor of the present disclosure refers to low crystalline iron hydroxide, which is brown in color.

The iron oxide powder precursor of another aspect before calcining into the iron oxide powder of the present disclosure is preferably a disc-shaped porous structure. When the iron oxide powder precursor was heated at 700° C. or higher, hematite was formed and a vivid red-yellow iron oxide powder was obtained.

[Method of Producing Iron Oxide Powder]

The iron oxide powder of the present disclosure can be produced by calcining an iron oxide powder precursor obtained by a co-precipitation method.

The calcining is carried out by a known method and is not particularly limited. The temperature rise rate is preferably from 1° C./min to 50° C./min, and the calcining temperature is preferably in a temperature range of from 600° C. to 1,200° C. for from 0 to 5 hours.

[Applications]

The iron oxide powder of the present disclosure can be used, for example, as a pigment or a coloring agent. The iron oxide powder of the present disclosure is applied as a pigment or coloring agent, for example, in a ceramic, an enamel, a painting, an asphalt, a plastic, a cosmetic, a paint, or a vehicle paint.

The iron oxide powder of the present disclosure can be used for applications other than pigments, such as a lithium ion battery electrode material, a catalyst, a photocatalyst, a catalyst support, or a magnetic material.

EXAMPLES

Hereinafter, the iron oxide powder of the present disclosure will be described in more detail by way of examples. Each of these examples is an example of a preferred embodiment of the present invention, and does not limit the present invention.

Examples 1 to 8, Comparative Examples 1 to 3

An iron oxide powder was obtained according to the flowchart illustrated in FIG. 1.

First, aluminum nitrate nonahydrate was added to 100 mL of 0.5 mol·dm$^{-3}$ iron nitrate aqueous solution in such a manner that the value of x=Al/(Al+Fe) is from 0 to 0.8 (that is, the content of aluminum is from 10 mol % to 80 mol %) to prepare a starting solution.

To this aqueous solution, ammonium bicarbonate in a molar amount (0.6 mol) that was 12 times the molar quantity of the metal ions was gradually added while stirring and mixing.

The mixture was then stirred for 0 to 2 hours and left to stand for 0 to 6 hours. The obtained suspension liquid was subjected to suction washing with 1 L or more of pure water, substitution with an appropriate amount of ethanol was performed, and drying in a vacuum was performed to obtain an iron oxide precursor. The obtained iron oxide powder precursor was brown in color in each case.

The iron oxide powder precursors obtained in the Examples were porous structures having a diameter of from 0.3 μm to 2 μm. The primary particle size of the porous structures forming the iron oxide powder precursors obtained in Examples 1 and 4 were 5 nm or less.

Red pigment powders (that is, iron oxide powders) were prepared by heating the obtained iron oxide powder precursors at from 700 to 1,200° C. for 2 hours at a temperature rise rate of 10° C./min. The specific heating conditions were 700° C. for 2 hours in Examples 1 to 6 and Comparative Examples 1 to 2, and 900° C. for 2 hours in Examples 7 to 8, and red pigment powders obtained were used as iron oxide powders obtained in the respective Examples. In Comparative Example 3, a commercially available product was used, as it was, as the iron oxide powder of Comparative Example 3.

In Examples 1 to 8, the diameter of the porous structure forming the obtained iron oxide powder tended to shrink by from 10% to 15% when compared to the diameter of the porous structure forming the iron oxide powder precursor before calcining.

With respect to the molar ratio between iron and aluminum in each of the Examples and Comparative Examples, the ratio shown in Table 1 below was used for preparation.

The results of measurements of the porous structure of the iron oxide powder obtained in each of the Examples and Comparative Examples, as measured by the above-described measurement method, are shown in Table 1.

The evaluation of the iron oxide powder obtained in each of the Examples and Comparative Examples were performed based on the evaluation methods described below, and the results are shown in Table 1.

TABLE 1

|  | Comparative Example 1 | Comparative Example 2 | Example 1 | Example 2 | Example 3 | Example 4 |
|---|---|---|---|---|---|---|
| Ingredient composition x (=Al/(Al + Fe)) | x = 0 | x = 0.05 | x = 0.1 | x = 0.15 | x = 0.2 | x = 0.3 |
| Diameter (μm) of porous structure |  |  | 0.91 | — | — | 0.64 |
| Thickness (μm) of porous structure |  |  | 0.32 | — | — | 0.19 |
| Primary particle size (nm) of iron oxide powder | — | 117 | 52 | 32 | 32 | 19 |
| Average particle size (nm) of alumina particles |  | None | None | 6 | 5 | 4 |
| BET specific surface area (m$^2$/g) | 7 | — | 16 | — | — | 80 |
| Pore volume (cm$^3$/g) | 0.05 | — | 0.11 | — | — | 0.37 |
| L* | 31.4 | 33.0 | 33.3 | 44.2 | 47.0 | 45.0 |
| a* | 26.7 | 24.9 | 32.7 | 39.6 | 38.7 | 40.2 |
| b* | 18.5 | 15.3 | 26.4 | 46.4 | 44.9 | 50.5 |
| Chroma (c*) | 32.5 | 29.2 | 42.1 | 61.0 | 59.3 | 64.5 |
| Heat resistance | — | — | — | — | — | 41.6 |

|  | Example 5 | Example 6 | Example 7 | Example 8 | Comparative Example 3 |
|---|---|---|---|---|---|
| Ingredient composition x (=Al/(Al + Fe)) | x = 0.4 | x = 0.5 | x = 0.6 | x = 0.7 | commercially available product |
| Diameter (μm) of porous structure | — | 1.51 | 0.40 | 0.46 |  |
| Thickness (μm) of porous structure | — | 0.74 | 0.17 | 0.15 |  |
| Primary particle size (nm) of iron oxide powder | 22 | Not measurable | — | — | — |
| Average particle size (nm) of alumina particles | 3 | Not measurable | — | — | — |
| BET specific surface area (m$^2$/g) | 114 | 149 | — | — | — |
| Pore volume (cm$^3$/g) | 0.38 | 0.54 | — | — | — |
| L* | 46.3 | 45.4 | 52.8 | 55.0 | 34.6 |
| a* | 38.4 | 37.7 | 33.4 | 34.8 | 30.7 |
| b* | 50.9 | 47.7 | 44.6 | 47.3 | 20.0 |
| Chroma (c*) | 63.7 | 60.8 | 55.7 | 58.7 | 36.7 |
| Heat resistance | 39.8 | 39.5 | 47.6 | 42.6 | 7.8 |

From the results shown in Table 1, it was found that the iron oxide powder obtained in each Example exhibited a vivid red color and high heat resistance.

On the other hand, the iron oxide powder obtained in each Comparative Example was inferior in at least one of chroma and heat resistance compared to the Examples.

"-" in Table 1 indicates "not performed".

Hereinafter, the iron oxide powders of the Examples and the Comparative Examples will be described in detail.

The iron oxide powders obtained in all the Examples were vivid red-yellow in color. In the Examples, similar trends and colors were observed in all samples, irrespective of differences in the amount of Al added.

Figure 2A:
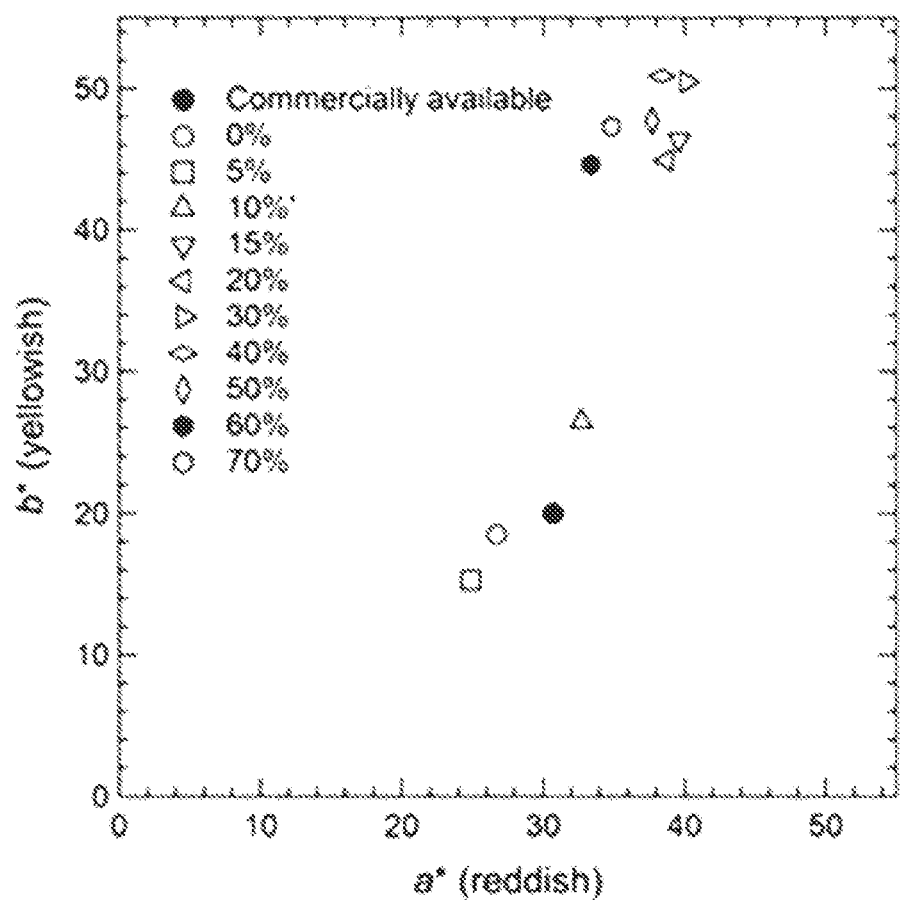
FIG. 2A is a graph illustrating the chroma of iron oxide powder in Examples and Comparative Examples.
Figure 2B:
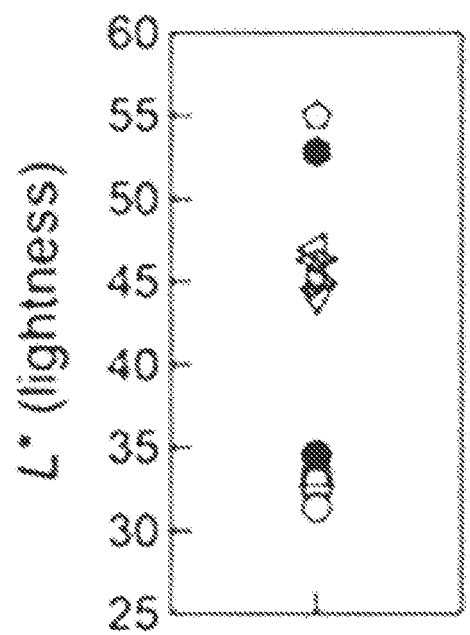
FIG. 2B is a graph illustrating the lightness of iron oxide powder in Examples and Comparative Examples.

For example, as shown in FIG. 2A and FIG. 2B, the color of the iron oxide powder obtained in each Example is comparable to the color of Comparative Example 3 (commercially available product), and in particular, in Examples 2 to 8, a chroma that was far superior to that of the commercially available product was obtained.

(Particle Morphology of Powder)

Figure 3A:
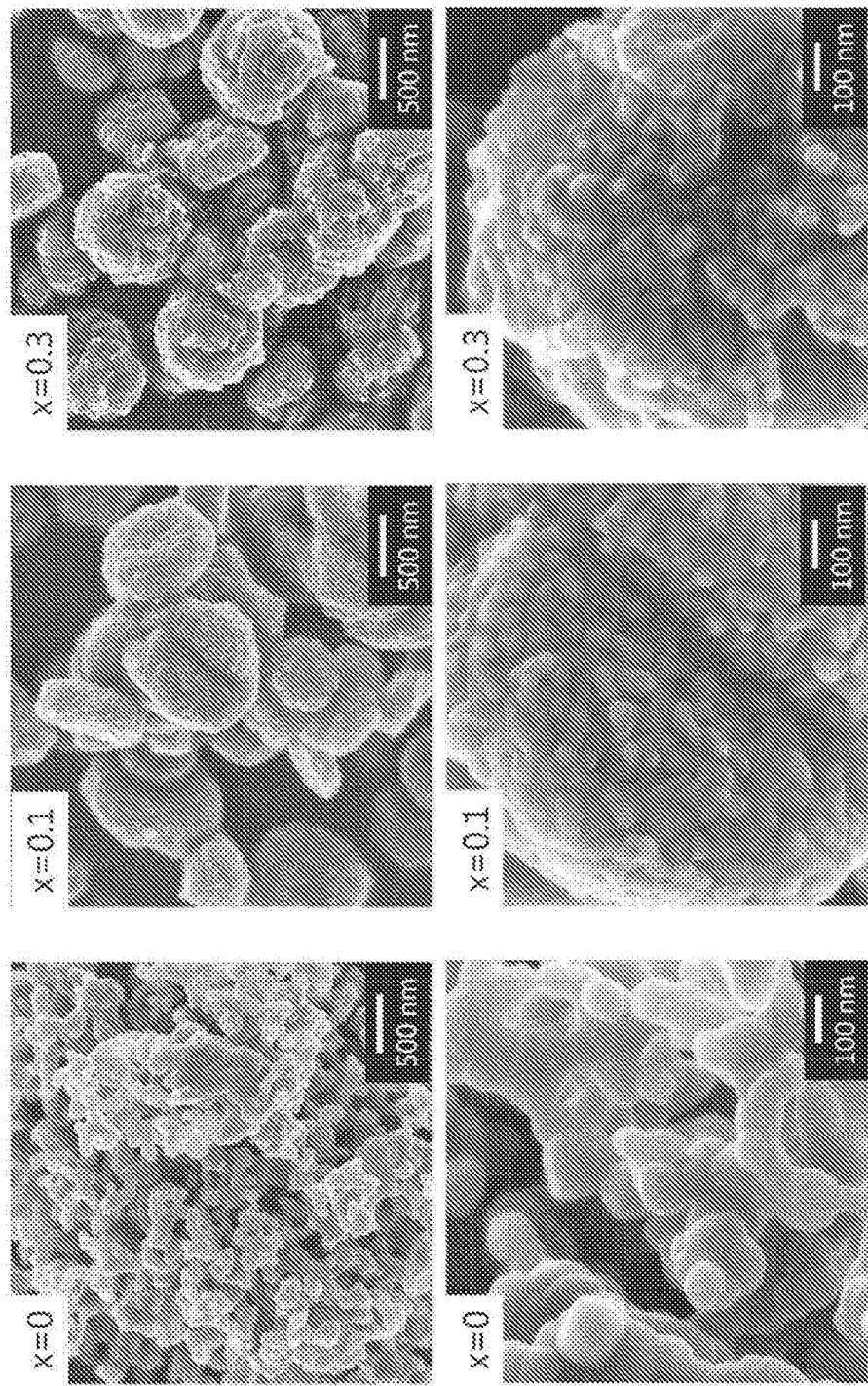
FIG. 3A is a scanning electron micrograph exhibiting the particle morphology of iron oxide powder in Examples and Comparative Examples.
Figure 3B:
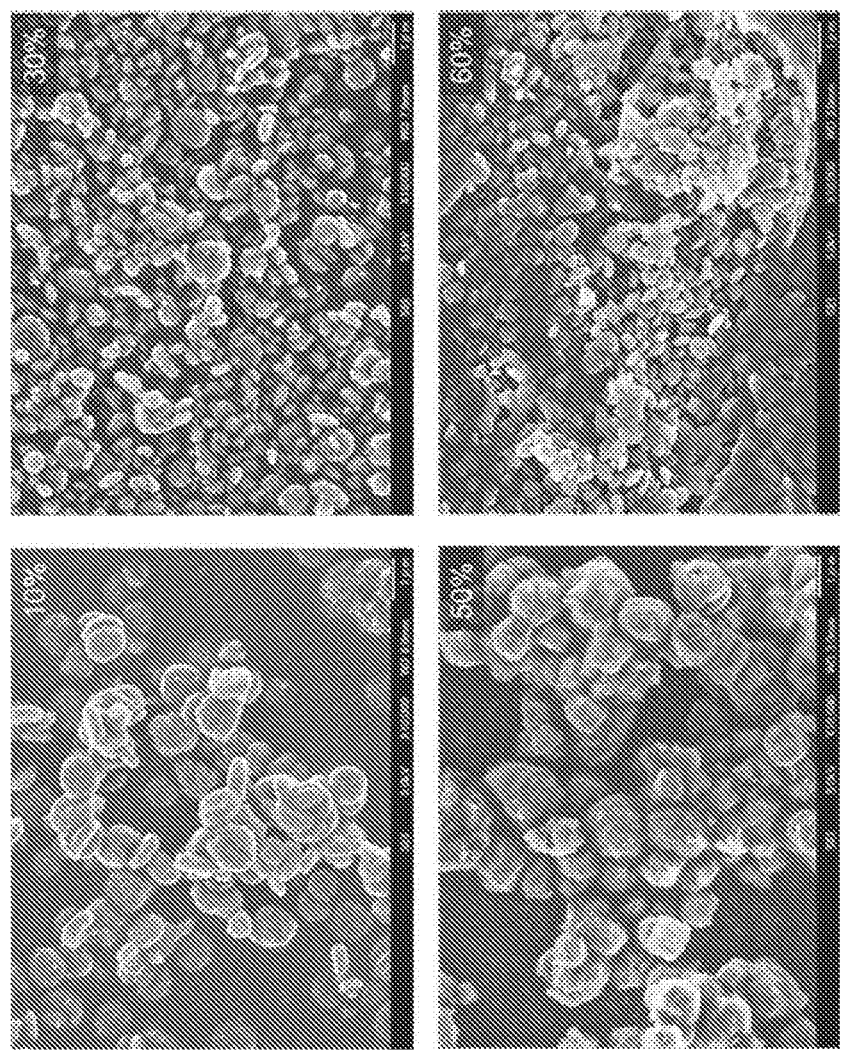
FIG. 3B is a scanning electron micrograph exhibiting the particle morphology of iron oxide powder of Examples.

When the morphology of the iron oxide powders obtained in Examples was observed by scanning electron microscopy, it was found that the morphology reflected the particle morphology of the precursor (see FIG. 3A and FIG. 3B). The scanning electron micrographs labeled as 10%, 30%, 50%, and 60% in FIG. 3B show the particle morphology at $x=0.1$, 0.3, 0.5, and 0.6, respectively.

As shown in FIG. 3A and FIG. 3B, the iron oxide powders of Examples were found to be a disc-shaped porous structure.

Specifically, at $x=0$, fine particles with a diameter of about 100 nm were observed to sinter and form an aggregate. This is the typical morphology of hematite particles similar to the morphology of the commercially available product.

On the other hand, in the samples with $x=0.1$ and 0.3 including added Al, fine particles less than 50 nm in diameter aggregated to form disc-shaped secondary particles of about 1 μm in diameter. The primary particle size of hematite in the sample with $x=0.3$, where the amount of Al added was large, was smaller than the primary particle size of hematite in the sample with $x=0.1$. Therefore, the morphology of the secondary particles reflected the morphology of the precursor.

Here, the observed disc-shaped secondary particles appeared to be relatively weakly bound to each other, and almost no aggregation due to sintering between the particles was observed. This result suggests that the disc-shaped secondary particles had high dispersibility.

When the samples with $x=0.1$ and $x=0.3$ were analyzed in more detail by STEM, it was observed that there were many gaps between the primary particles of hematite, suggesting that there were many pores in the disc-shaped secondary particles.

Figure 4:
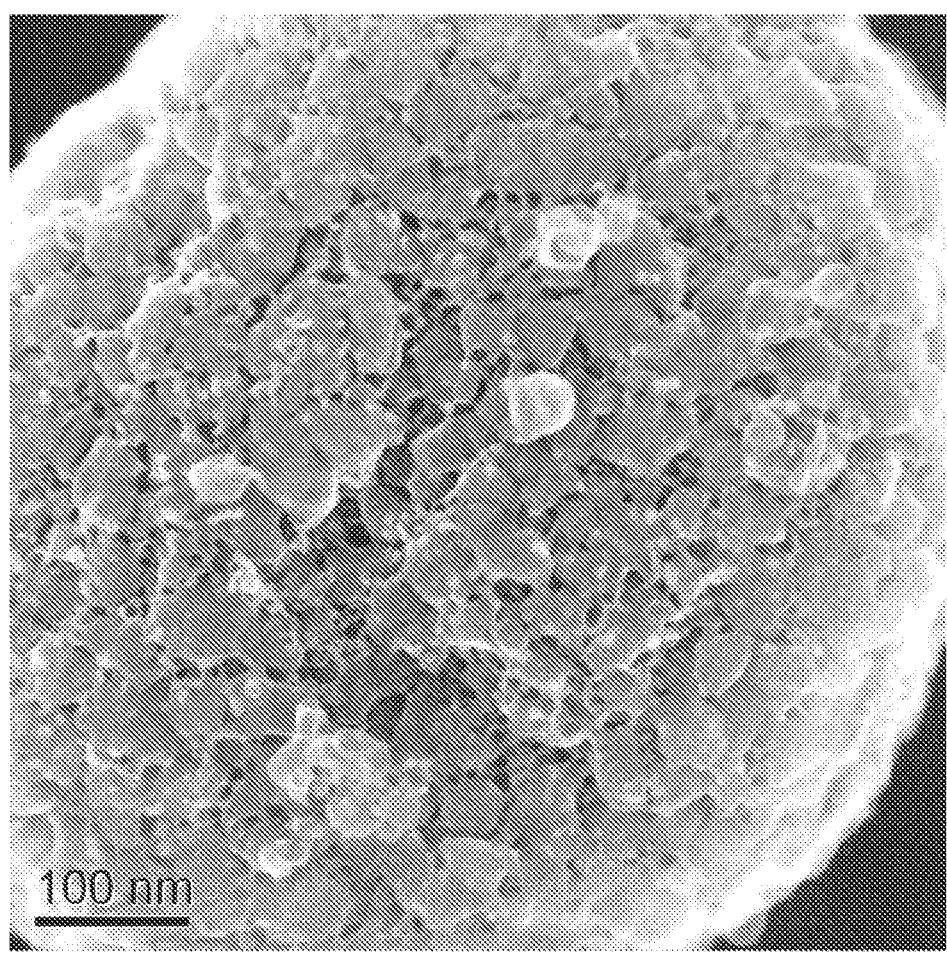
FIG. 4 is a scanning transmission electron micrograph exhibiting the particle morphology of Examples (secondary electron image).

In the sample with $x=0.3$, for example, as shown in FIG. 4, a state was observed in which fine particles smaller than 10 nm, being even smaller than the hematite particles, were scattered around the hematite particles. These particles attached to the surface of a porous structure are considered to be surplus Al oxides that could not be involved in solid solution in hematite.

The primary particle size and the average particle size of alumina in the porous structure in Example 6 are described as "not measurable" in Table 1. Specifically, the sample in Example 6 was overcharged, and therefore the particles could not be accurately identified by the above-described method.

The crystallite size of the sample in Example 6 as measured by X-ray diffraction method was 14 nm, which was found to be similar to the crystallite size of the sample with $x=0.3$, while the crystallite size of the sample with $x=0.1$ was 26 nm.

(Evaluation of Powder by Nitrogen Absorption/Desorption Method)

In order to analyze the distribution of pores and the surface area of the obtained iron oxide powder, evaluation was carried out by the nitrogen absorption/desorption method. The evaluation method was the same as the method described above in embodiments of the invention.

Figure 5:
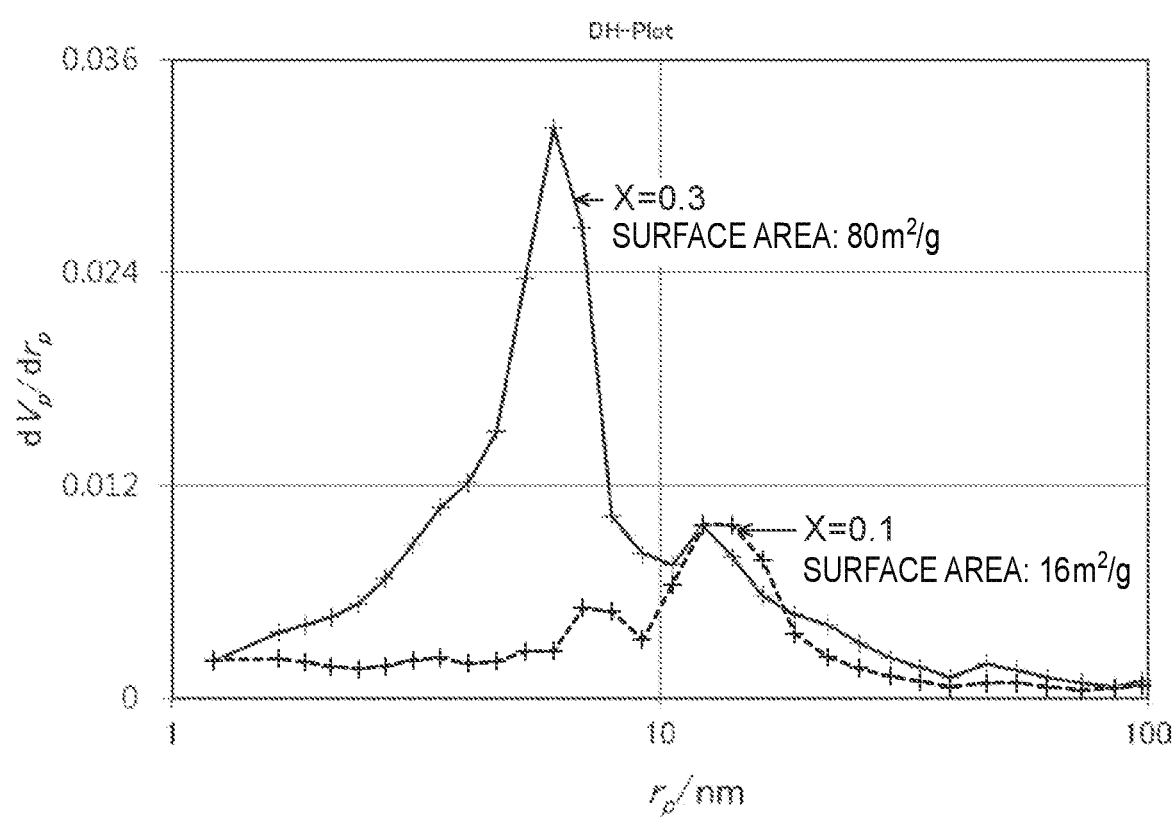
FIG. 5 is a graph illustrating the evaluation of Examples by a nitrogen absorption/desorption method.

As shown in FIG. 5, the sample with $x=0.1$ had characteristic pores at 12 nm and a relatively high specific surface area of 16 $m^2/g$ (commercially available product: 13 $m^2/g$).

The sample with $x=0.3$ had characteristic pores at 6 nm and a very large surface area of 80 $m^2/g$, which was about 4.5 times larger than the surface area of the commercially available product.

These results indicate that the prepared samples are porous.

(Evaluation of Heat Resistance)

Since samples heated at 700° C. with $x=0.3$ and $x=0.5$ exhibited a similar degree of chroma, these samples were subjected to a heat resistance test.

The heat resistance test was carried out by checking color fading when the powder samples obtained by heating the samples at 700° C. were further treated at from 1,000 to 1,400° C. for 1 hour ("Heat Resistance Evaluation Method 1") or checking the color fading when precursor samples before calcining were treated at a high temperature of more than 1,000° C. for 2 hours ("Heat Resistance Evaluation Method 2").

Specifically, the following methods were used for evaluation.

<Heat Resistance Evaluation Method 1>

For Examples 4 to 6 and Comparative Example 3 (commercially available product), the powder samples were treated at a high temperature of 1,100° C. for 1 hour, and evaluated according to the following evaluation criteria. The results are shown in Table 1.

Very good: The C* value after high temperature treatment is 35 or more
Good: The C* value after high temperature treatment is from 10 to 35
Bad: The C* value after high temperature treatment is less than 10

<Heat Resistance Evaluation Method 2>

For Examples 7 and 8, the precursor samples before calcining were treated at a high temperature of 1,200° C. for 2 hours, and evaluated according to the above-described evaluation criteria. The results are shown in Table 1.

With respect to heat resistance, Table 1 demonstrates that, in Examples 4 to 6, the chroma of the iron oxide powders maintained the same level of chroma as that of the commercially available product even when having been exposed to a high temperature of 1,100° C., and the red color was maintained up to 1,300° C. when visually observed. In Examples 7 and 8, the chroma of the obtained iron oxide powders was excellent in spite of having been heated at a high temperature of 1,200° C.

Figure 6:
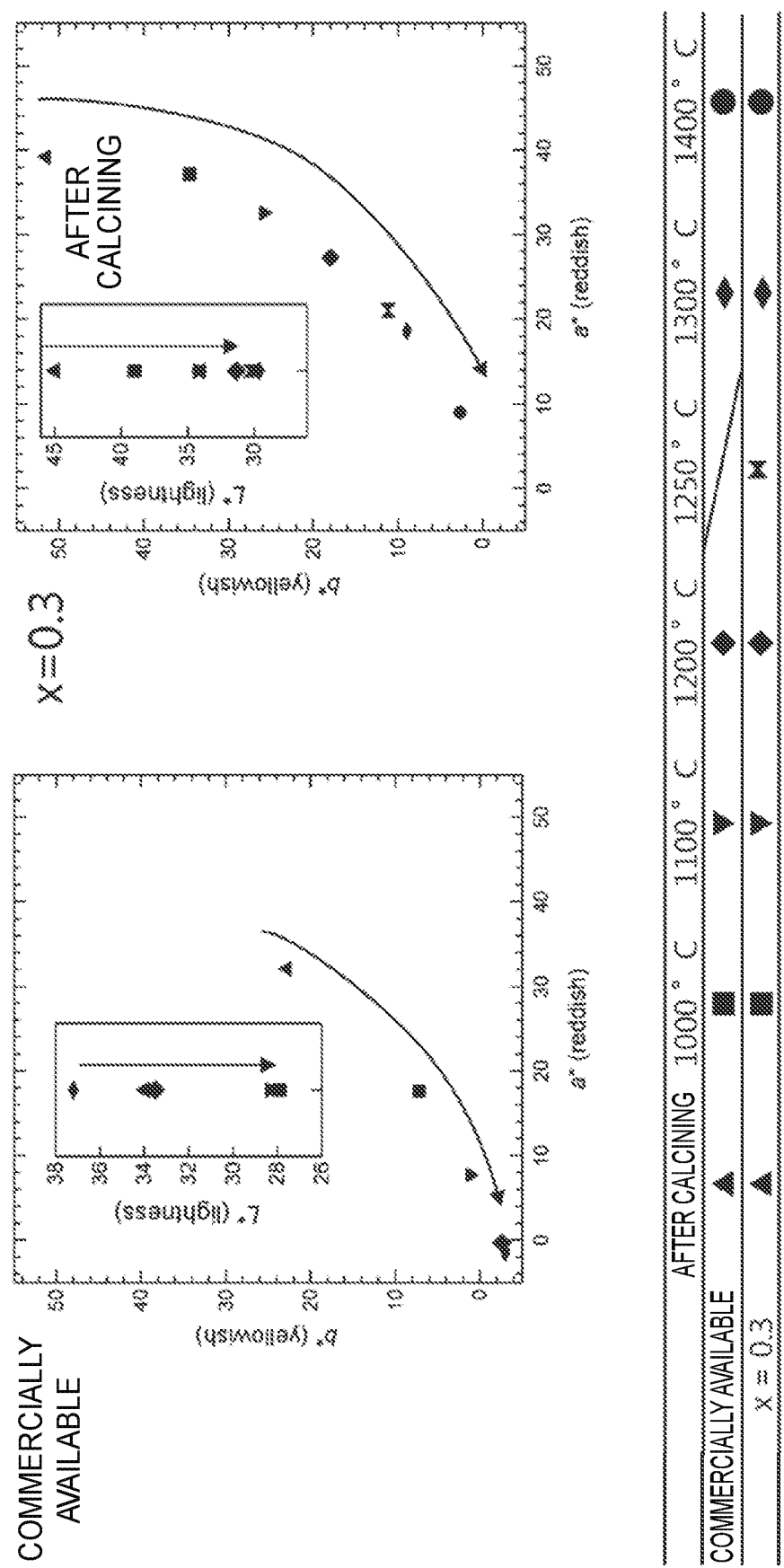
FIG. 6 is a graph illustrating the heat resistance evaluation of iron oxide powder in Examples and Comparative Examples.

Furthermore, as shown in FIG. 6, when the change in chroma caused by heating at high temperatures was examined with respect to the commercially available product and the powder sample with $x=0.3$, the sample according to the present disclosure heated at 1,300° C. has higher chroma than the sample of the commercially available product reheated at 1,000° C.

These results indicate that the samples prepared according to the present disclosure have excellent heat resistance.

Examples 9-1 to 9-4, and Comparative Examples 4-1 to 4-2

Iron oxide powder was prepared in the same manner as that in Example 4, except that the concentration of iron nitrate aqueous solution was adjusted to the value shown in Table 2. The evaluation of heat resistance was carried out in the same manner as <Heat Resistance Evaluation Method 1> described above.

Example 9-3 is identical to Example 4 described above.

TABLE 2

|  | Example 9-1 | Example 9-2 | Example 9-3 | Example 9-4 | Comparative Example 4-1 | Comparative Example 4-2 |
|---|---|---|---|---|---|---|
| x (= Al/(Al + Fe)) | x = 0.3 | x = 0.3 | x = 0.3 | x = 0.3 | x = 0.3 | x = 0.3 |
| Concentration (mol · dm$^{-3}$) of iron nitrate solution | 0.2 | 0.3 | 0.5 | 0.7 | 0.1 | 0.05 |
| Diameter (μm) of porous structure | 0.37 | 0.49 | 0.64 | 0.6 | — | — |
| Thickness (μm) of porous structure | 0.20 | 0.20 | 0.19 | 0.2 | — | — |
| L* | 36.18 | 42.5 | 45.0 | 37.16 | 25.26 | 28.4 |
| a* | 33.58 | 35.37 | 40.2 | 35.8 | 21.93 | 5.4 |
| b* | 35.29 | 45.64 | 50.5 | 46.22 | 17.33 | 1.9 |
| Chroma (c*) | 48.7 | 57.7 | 64.5 | 58.5 | 28.0 | 5.7 |
| Heat resistance | — | 40.3 | 41.6 | 41.2 | 25.1 | — |

Figure 7:
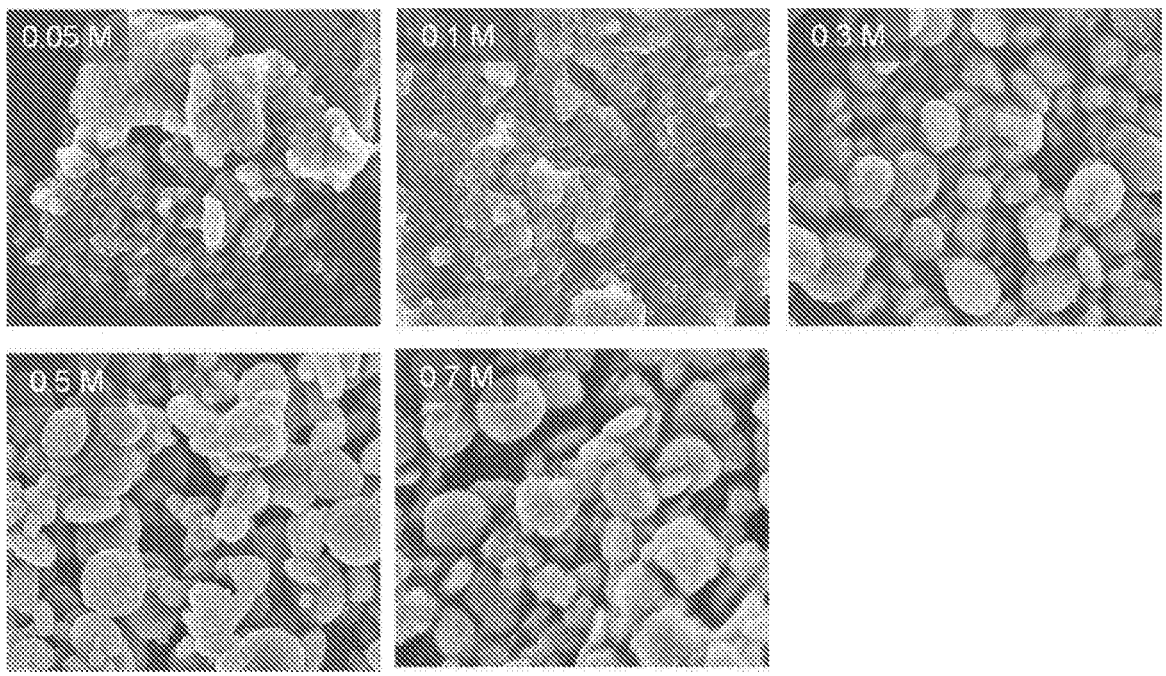
FIG. 7 is a scanning electron micrograph exhibiting the particle morphology of iron oxide powder of Examples.

As can be seen from Table 2, the iron oxide powders obtained in Examples had high chroma and excellent heat resistance compared to Comparative Examples. In particular, in Examples 9-2 to 9-4, in which the concentration of nitric acid aqueous solution was adjusted in the range of from 0.3 mol·dm$^{-3}$ to 0.7 mol·dm$^{-3}$, iron oxide powders with considerably high chroma and high heat resistance were obtained. As shown in FIG. 7, in the range of from 0.3 mol·dm$^{-3}$ (also referred to as "0.3 M") to 0.7 mol·dm$^{-3}$ (also referred to as "0.7 M"), in which the iron oxide powders showed considerably high chroma, the particle morphology of the iron oxide powder was observed to be disc-shaped. Since the iron oxide powders obtained in Examples 4-1 and 4-2 did not form a porous structure, the diameter and thickness could not be measured.

Examples 10-1 to 10-3, Comparative Examples 5-1 to 5-2

Iron oxide powder was prepared in the same manner as that in Example 4, except that the raw materials shown in Table 3 were used instead of the iron nitrate used in the iron nitrate aqueous solution. The evaluation of heat resistance was performed in the same manner as <Heat Resistance Evaluation Method 1> as described above.

TABLE 3

|  | Example 10-1 | Example 10-2 | Example 10-3 | Comparative Example 5-1 | Comparative Example 5-2 |
|---|---|---|---|---|---|
| x (=Al/(Al + Fe)) | x = 0.3 | x = 0.3 | x = 0.3 | x = 0.3 | x = 0.3 |
| Raw material used for starting solution | Iron chloride (II) (FeCl$_2$) | Iron sulfate (II) (FeSO$_4$) | Iron sulfate (III) Fe$_2$(SO$_4$)$_3$ | Iron oxalate Fe(C$_2$O$_4$) | Iron chloride (III) FeCl$_3$ |
| Diameter (μm) of porous structure | 0.41 | 0.46 | 0.50 | — | — |
| Primary particle size (nm) of iron oxide powder | 62 | 27 | 28 | 55 | — |
| L* | 43.3 | 47.3 | 44.3 | 33.9 | 40.3 |
| a* | 34.5 | 38.0 | 36.9 | 19.2 | 25.9 |
| b* | 37.6 | 48.8 | 46.0 | 16.9 | 24.1 |
| Chroma (c*) | 51.0 | 61.8 | 59.0 | 25.6 | 35.8 |
| Heat resistance | — | 44.6 | 44.3 | — | — |

Figure 8:
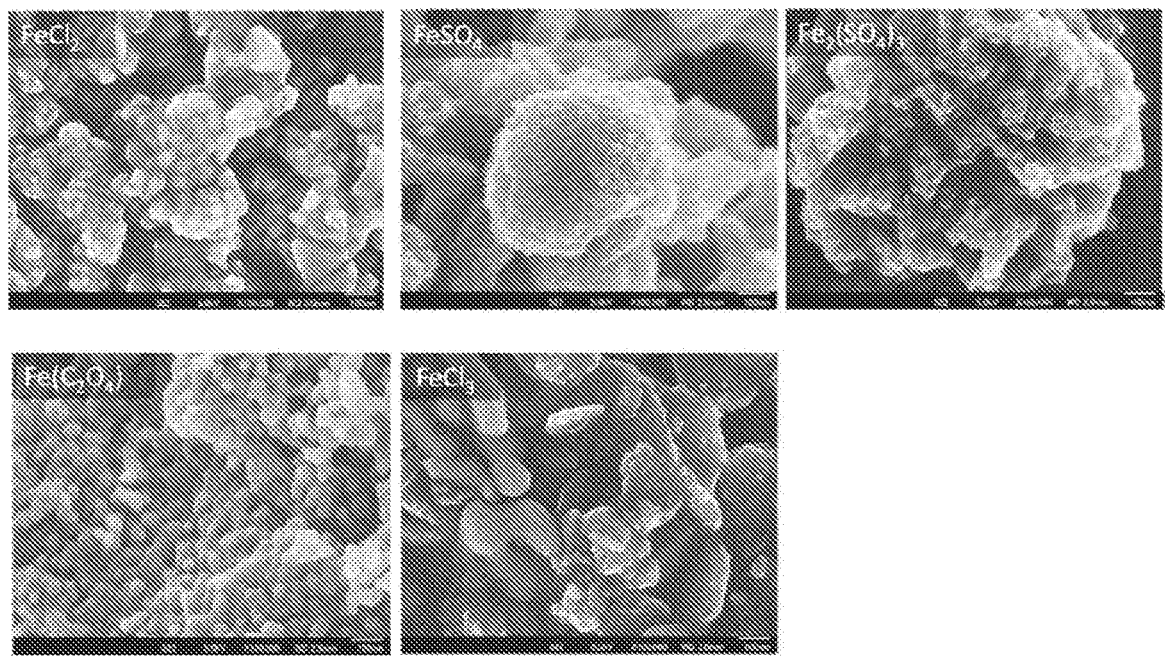
FIG. 8 is a scanning electron micrograph exhibiting the particle morphology of iron oxide powder in Examples and Comparative Examples.

As can be seen from Table 3, the iron oxide powders obtained in Examples had high chroma and excellent heat resistance. As shown in FIG. 8, the iron oxide powders of Examples obtained using iron (II) chloride, iron (II) sulfate, or iron (III) sulfate as the starting material, which showed considerably high chroma, were porous structures having a diameter of from 0.3 μm to 2 μm. On the other hand, in the iron oxide powders of Comparative Examples, the primary particles formed large aggregates and the above-described porous structure was not observed, and therefore the diameters of the porous structures could not be measured. Furthermore, in Comparative Example 5-2, the primary particles could not be identified, and the primary particle size could not be measured.

The disclosure of Japanese Patent Application 2018-118338, filed on Jun. 21, 2018, is incorporated herein by reference in its entirety.

All publications, patent applications, and technical standards mentioned in the present specification are incorporated herein by reference to the same extent as if each individual publication, patent application, or technical standard was specifically and individually indicated to be incorporated by reference.

In relation to the above embodiments, the following modes are further disclosed.

<1> An iron oxide powder which includes a disc-shaped porous structure, the iron oxide powder having an aluminum content of from 10 mol % to 80 mol %.

<2> The iron oxide powder according to <1>, wherein the porous structure has a diameter of from 0.3 μm to 2 μm and a thickness of from 150 nm to 800 nm.

<3> The iron oxide powder according to <1> or <2>, wherein alumina particles are attached to the surface of the porous structure.

<4> The iron oxide powder according to any one of <1> to <3>, wherein the porous structure has a BET specific surface area of from 20 m$^2$/g to 150 m$^2$/g and a pore volume of from 0.15 cm$^3$/g to 0.60 cm$^3$/g.

<5> The iron oxide powder according to any one of <1> to <4>, wherein a primary particle size of iron oxide powder of the porous structure is from 10 nm to 50 nm.

<6> A method of producing an iron oxide powder precursor, the method including mixing iron nitrate, aluminum nitrate, and ammonium bicarbonate, and producing the iron oxide powder precursor by a co-precipitation method.

<7> A method of producing an iron oxide powder, the method including producing an iron oxide powder by calcining the iron oxide powder precursor obtained by the method of producing an iron oxide powder precursor according to <6>.

The invention claimed is:

1. An iron oxide powder, comprising a porous structure having a diameter of from 0.3 μm to 2 μm, the iron oxide powder having an aluminum content of from 10 mol % to 80 mol %, wherein the porous structure has a BET specific surface area of from 20 m$^2$/g to 150 m$^2$/g and a pore volume of from 0.15 cm$^3$/g to 0.60 cm$^3$/g.

2. The iron oxide powder according to claim 1, wherein alumina particles are attached to a surface of the porous structure.

3. The iron oxide powder according to claim 1, wherein the porous structure comprises an aggregate of primary particles, and an average particle size of the primary particles is from 10 nm to 50 nm.

4. The iron oxide powder according to claim 1, wherein the iron oxide powder exhibits a chroma of 25 or more when the iron oxide powder is heated at 1,100° C. for 1 hour.

5. A composition, comprising the iron oxide powder according to claim 1.

6. A ceramic, comprising:
a substrate layer; and
a glaze layer containing the iron oxide powder according to claim 1.

7. An iron oxide powder precursor, comprising a porous structure having a diameter of from 0.3 μm to 2 μm, the iron oxide powder precursor having an aluminum content of from 10 mol % to 80 mol %.

8. The iron oxide powder precursor according to claim 7, wherein the porous structure comprises an aggregate of primary particles, and an average particle size of the primary particles is 5 nm or less.

9. A method of producing the iron oxide powder precursor according to claim 7, the method comprising:
mixing aluminum nitrate, ammonium bicarbonate, and at least one metal salt selected from the group consisting of iron nitrate, iron sulfate, and iron chloride (II); and
producing the iron oxide powder precursor by employing a co-precipitation method.

10. The method of producing an iron oxide powder precursor according to claim 9, wherein the aluminum nitrate, the ammonium bicarbonate, and an aqueous solution that contains the at least one metal salt at a total concentration of from 0.3 mol·dm$^{-3}$ to 0.7 mol·dm$^{-3}$ are mixed, and the iron oxide powder precursor is produced by employing a co-precipitation method.

11. A method of producing an iron oxide powder, the method comprising calcining the iron oxide powder precursor obtained by the method of producing an iron oxide powder precursor according to claim 9, thereby producing the iron oxide powder.

* * * * *